(12) United States Patent (10) Patent No.: US 7,720,258 B1
Ullmann (45) Date of Patent: May 18, 2010

(54) STRUCTURED COMPARISON OF OBJECTS FROM SIMILAR IMAGES

(75) Inventor: Peter Frank Ullmann, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1147 days.

(21) Appl. No.: 11/341,938

(22) Filed: Jan. 26, 2006

(51) Int. Cl.
*G06K 9/00* (2006.01)
*H04N 7/18* (2006.01)

(52) U.S. Cl. ....................... 382/103; 348/161
(58) Field of Classification Search ............. 382/103, 382/107, 115, 116, 117, 118, 162, 168, 199, 382/289, 297, 209, 218; 348/94, 154, 155, 348/207.99, 222.1, 231.99, 207, 231.6, 362, 348/129, 161, 169, 179, 414.1, 417.1; 707/1, 707/3, 4, 6, 7; 715/723, 796, 806

See application file for complete search history.

(56) References Cited

U.S. PATENT DOCUMENTS

| 4,651,146 | A | 3/1987 | Lucash et al. |
|---|---|---|---|
| 5,943,093 | A | 8/1999 | Anderson et al. |
| 5,963,203 | A | 10/1999 | Goldberg et al. |
| 6,182,069 | B1 | 1/2001 | Niblack et al. |
| 6,324,555 | B1 | 11/2001 | Sites |
| 6,366,296 | B1 | 4/2002 | Boreczky et al. |
| 6,714,672 | B1 * | 3/2004 | Berestov et al. ............ 382/154 |
| 6,728,728 | B2 | 4/2004 | Spiegler et al. |
| 6,879,709 | B2 | 4/2005 | Tran et al. |
| 6,940,545 | B1 * | 9/2005 | Ray et al. ................ 348/222.1 |
| 7,155,036 | B2 * | 12/2006 | Li ............................. 382/118 |
| 7,171,023 | B2 * | 1/2007 | Kim et al. .................... 382/103 |
| 7,171,630 | B2 * | 1/2007 | O'Leary et al. ............. 715/856 |
| 7,274,832 | B2 * | 9/2007 | Nicponski ................... 382/297 |
| 7,343,365 | B2 | 3/2008 | Farnham et al. |
| 7,403,642 | B2 | 7/2008 | Zhang et al. |
| 7,477,805 | B2 | 1/2009 | Ohtsuka et al. |
| 7,519,200 | B2 * | 4/2009 | Gokturk et al. ............. 382/118 |
| 7,587,101 | B1 | 9/2009 | Bourdev |
| 2001/0053292 | A1 | 12/2001 | Nakamura |
| 2002/0074398 | A1 | 6/2002 | Lancos et al. |
| 2002/0103813 | A1 | 8/2002 | Frigon |
| 2003/0023754 | A1 | 1/2003 | Eichstadt et al. |
| 2003/0033296 | A1 | 2/2003 | Rothmuller et al. |
| 2003/0210808 | A1 | 11/2003 | Chen et al. |
| 2004/0008906 | A1 | 1/2004 | Webb |
| 2004/0017930 | A1 | 1/2004 | Kim et al. |
| 2004/0060976 | A1 | 4/2004 | Blazey et al. |
| 2004/0064455 | A1 | 4/2004 | Rosenzweig et al. |

(Continued)

OTHER PUBLICATIONS

U.S. Appl. No. 11/097,951, Newell et al.

(Continued)

*Primary Examiner*—Abolfazl Tabatabai
(74) *Attorney, Agent, or Firm*—Van Pelt, Yi & James LLP (57) ABSTRACT

Associating subimages is disclosed. A first set of one or more subimages associated with a first image and a second set of one or more subimages associated with a second image are received. It is determined that a first subimage of the first set corresponds to a second subimage of the second set based at least in part on spatial information associated with the first subimage. The first subimage and the second subimage are associated.

24 Claims, 9 Drawing Sheets

U.S. PATENT DOCUMENTS

| | | |
|---|---|---|
| 2004/0101212 A1 | 5/2004 | Fedorovskaya et al. |
| 2004/0204635 A1 | 10/2004 | Scharf et al. |
| 2004/0267612 A1 | 12/2004 | Veach |
| 2005/0011959 A1 | 1/2005 | Grosvenor |
| 2005/0013488 A1 | 1/2005 | Hashimoto et al. |
| 2005/0025376 A1 | 2/2005 | Ishida |
| 2005/0041114 A1 | 2/2005 | Kagaya |
| 2005/0046730 A1 | 3/2005 | Li |
| 2005/0050027 A1 | 3/2005 | Yeh et al. |
| 2005/0063568 A1 | 3/2005 | Sun et al. |
| 2005/0105779 A1* | 5/2005 | Kamei ............ 382/118 |
| 2005/0117870 A1 | 6/2005 | Lee |
| 2005/0128221 A1 | 6/2005 | Aratani et al. |
| 2005/0129276 A1 | 6/2005 | Haynes et al. |
| 2005/0147302 A1 | 7/2005 | Leung |
| 2005/0157952 A1 | 7/2005 | Gohda et al. |
| 2005/0172215 A1 | 8/2005 | Squibbs et al. |
| 2005/0196069 A1 | 9/2005 | Yonaha |
| 2005/0207630 A1 | 9/2005 | Chan et al. |
| 2005/0213793 A1 | 9/2005 | Oya et al. |
| 2005/0285943 A1 | 12/2005 | Cutler |
| 2006/0008145 A1 | 1/2006 | Kaku |
| 2006/0008152 A1 | 1/2006 | Kumar et al. |
| 2006/0032916 A1 | 2/2006 | Mueller et al. |
| 2006/0050934 A1 | 3/2006 | Asai |
| 2006/0053364 A1 | 3/2006 | Hollander et al. |
| 2006/0071942 A1 | 4/2006 | Ubillos et al. |
| 2006/0098737 A1* | 5/2006 | Sethuraman et al. ... 375/240.16 |
| 2006/0120572 A1 | 6/2006 | Li et al. |
| 2006/0140455 A1 | 6/2006 | Costache et al. |
| 2006/0161588 A1 | 7/2006 | Nomoto |
| 2006/0171573 A1 | 8/2006 | Rogers |
| 2006/0222243 A1* | 10/2006 | Newell et al. ............ 382/173 |
| 2006/0251338 A1 | 11/2006 | Gokturk et al. |
| 2007/0071323 A1 | 3/2007 | Kontsevich et al. |
| 2007/0081744 A1 | 4/2007 | Gokturk et al. |
| 2007/0098303 A1 | 5/2007 | Gallagher et al. |
| 2007/0183638 A1 | 8/2007 | Nakamura |
| 2007/0242856 A1 | 10/2007 | Suzuki et al. |
| 2008/0080745 A1 | 4/2008 | Vanhoucke et al. |
| 2009/0016576 A1 | 1/2009 | Goh et al. |
| 2009/0160618 A1 | 6/2009 | Kumagai et al. |

OTHER PUBLICATIONS

"Notes and Tags". p. 3 pf 6. http://www.flickr.com/learn_more_3.gne.

Riya—Photo Search. http://www.riya.com.

Riya—Photo Search. http://www.riya.com/corp/learn-more.jsp.

Riya—Photo Search. http://www.riya.com/corp/learn-more-s2.jsp.

Riya—Photo Search. http://www.riya.com/corp/learn-more-s3.jsp.

Riya—Photo Search. http://www.riya.com/corp/learn-more-s5.jsp.

Riya—Photo Search. http://www.riya.com/corp/learn-more-s6.jsp.

Gormish, Michael J.. "JPEG 2000: Worth the Wait?" Ricoh Silicon Valley, Inc. pp. 1-4.

Yang et al. "Detecting Faces in Images: A Survey." IEEE Transactions of Pattern Analysis and Machine Intelligence. vol. 4, No. 1. Jan. 2003. pp. 34-58.

Sun et al. "Quantized Wavelet Features and Support Vector Machines for On-Road Vehicle Detection." Dept. of Computer Science, U. of Nevada, Reno & e-Technology Dept., Ford Motor Company. Dearborn. MI. pp. 1-6.

Schneiderman, Henry. "A Statistical Approach to 3D Object Detection." Robotics Institute, Carnegie Mellon University. Pittsburgh. PA. 2000.

Yang, Ming-Hsuan. "Recent Advances in Face Detection." Honda Research Institute, Mountain View, CA.

Jennifer Granick, "Face It: Privacy Is Endangered", Dec. 7, 2005.

Michael Arrington, "First Screen Shots of Riya". Oct. 26, 2005.

Pentland et al. (Jun. 1996) "Photobook: Content-based manipulation of image databases," Int'l J. Computer Vision, vol. 18 No. 3, pp. 233-254.

Ma et al. (Sep. 2000) "An indexing and browsing system for home vido," Proc. 2000 European Signal Processing Conf., pp. 131-134.

* cited by examiner

STRUCTURED COMPARISON OF OBJECTS FROM SIMILAR IMAGES

BACKGROUND OF THE INVENTION

Automatic detection processes can be used to find items in an image and can be a powerful tool. For example, a face detection process can detect faces of people in an image. With digital cameras becoming increasingly popular, more and more digital images are being created. Face detection technology enables management of the increasing number of digital images for personal and commercial use.

In some cases, two images are similar to each other. For example, a photographer may take multiple photographs of a group of people. However, it may be difficult for a user to view objects detected from similar images using existing display techniques. In some applications, a screen size may be relatively small, or a face detected in an image may be small with respect to the image. Techniques to assist users in viewing objects detected from similar images may be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
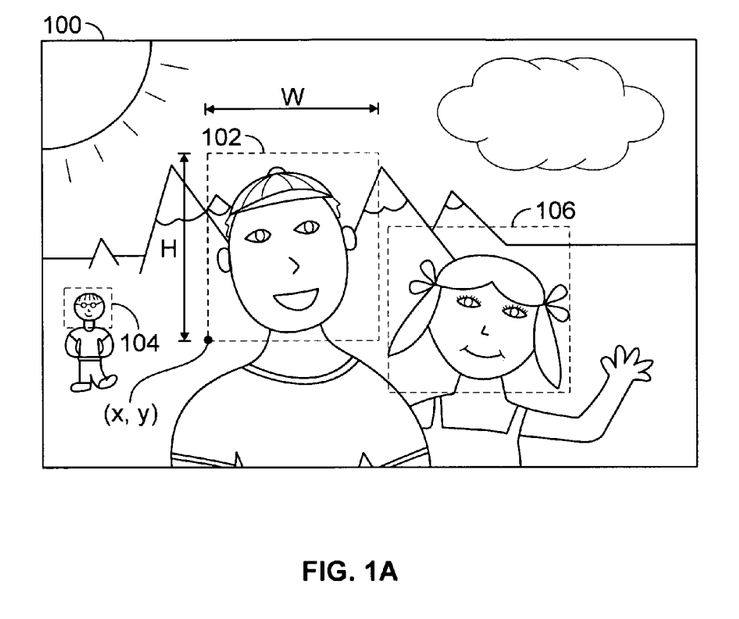
FIG. 1A is a diagram illustrating an embodiment of an image and objects that are detected from the image.

FIG. 1A is a diagram illustrating an embodiment of an image and objects that are detected from the image. In the example shown, image 100 may be a file in a variety of formats, including Joint Photographic Experts Group (JPEG), Graphics Interchange Format (GIF), Tagged Image File Format (TIFF), and Portable Network Graphics (PNG). In some embodiments, image 100 is generated using a digital camera. Although images may be described in the examples herein, any visual data (including video, streaming video, and graphical data) may be used in various embodiments.

Automatic detection processing is performed on image 100. Automatic detection processing detects occurrences of a detection object in an image. Automatic detection processing may be performed using various techniques. For example, Eigenfaces, Adaboost, neural networks, may be used. A two dimensional pattern matching technique may be used. A three dimensional model of the object may be used to approximate the object. In some embodiments, the detection object is a face and Adobe® Photoshop® Elements is used to perform automatic face detection.

Objects are output by an automatic detection process and are believed by the automatic detection process to include an occurrence of the detection object. Automatic detection processes do not necessarily attempt to detect a particular detection object (for example, the face of a particular person). Rather, the process may attempt to detect any occurrence of a detection object in an image (for example, the face of any person). In some embodiments, including this example, each object includes one and only one occurrence of a detection object. Examples of detection objects include a face, person, animal, car, boat, book, table, tree, mountain, etc.

Objects may be associated with a subimage or a portion of an image and may be described in a variety of ways. In this example, objects are associated with rectangular shaped boundary. In some embodiments, objects output by an automatic detection process have a non-rectangular shape, such as a round shape. Object 102 may be described by coordinates (x, y). Coordinates (x, y) may describe the location of the lower left corner of object 102 (i.e., the origin point of object 102) with respect to the origin of the image (i.e., the lower left corner of image 100). A variety of units may be used for coordinates (x, y), such as pixels or millimeters. Object 102 in this example is also described by a height, H, and a width, W. In some embodiments, objects output by an automatic detection process have a fixed aspect ratio (i.e., a fixed width to height ratio). For example, although the sizes of objects 102 and 104 are different, the aspect ratios of the two objects may be the same.

Additional information associated with each object may be output by an automatic detection process. In some embodiments, a probability that a given object includes an occurrence of the detection object is output. For example, a face detection process may generate a probability that object 106 includes a face. In some embodiments, one or more angles are output by an automatic detection process. An angle may be associated with an orientation, rotation, or tilt of the occurrence of the detection object. For example, one angle may describe the tilt of the face with respect to a vertical axis. Another angle may describe the rotation of the face.

Automatic detection processes can be imperfect. Sometimes, an automatic detection process may not be able to detect an occurrence of a detection object. For example, some face detection processes may not be able to detect the face of a person if the face is too small in an image. An automatic detection process can also generate "false alarms." A face detection process may output an object that does not include a face.

In some embodiments, subsequent processing may be performed on an image or an associated object after automatic detection processing. In some embodiments, automatic object identification is performed. For example, a face identification process may be performed where detected objects are evaluated to determine whether the objects contain the face of a particular person. Identification may be performed using various techniques. For example, a technique based on Adaboost, Linear Discriminant Analysis (LDA), or principal component analysis (PCA) may be used to perform object identification. In some embodiments, an automatic matching process is performed. For example, a face matching process is performed, where multiple objects from multiple images are compared and similar faces are matched together. This may improve confidence in compared regions across images.

Object detection may be automatic or manual. For example, a user may have drawn a box around any of faces 102, 104, and 106 to detect a face. The output of a manual detection process may include the same information as the output of an automatic detection process. The probability that a manually detected object includes the detection object may be set to 1. In some embodiments, objects obtained using a manual detection process are normalized. For example, manually detected objects may be normalized to match the aspect ratio of automatically detected objects. In some cases, all of the manually detected objects are normalized to a standard parameter or scale. In some embodiments, a normalization process to conform all objects to a standardized size is based on various parameters.

Table 1 lists examples of information that may be stored for various objects. This information may be output by an object detector. In this example, objects 1-5 were automatically detected and object 6 was manually detected. Such information may be stored in one or more of a database, file metadata, file, or in any other appropriate way.

Figure 1B:
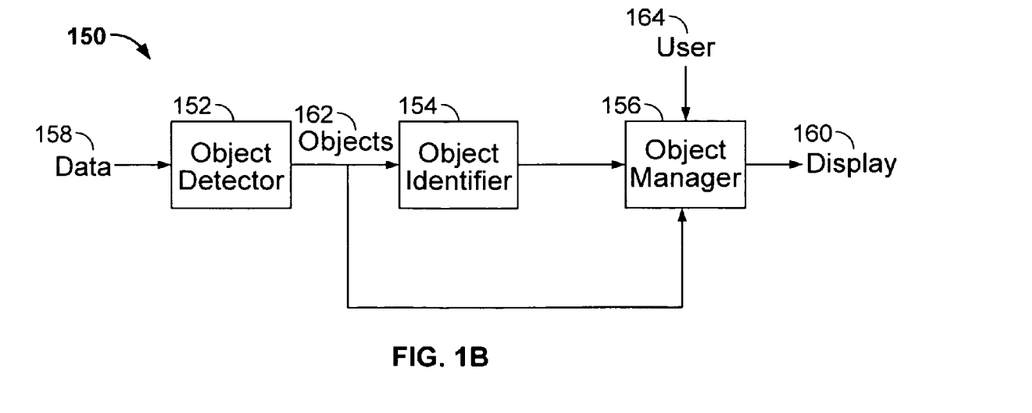
FIG. 1B is a block diagram illustrating an embodiment of a system for detecting and processing objects.

FIG. 1B is a block diagram illustrating an embodiment of a system for detecting and processing objects. In this example, system 150 includes object detector 152, object identifier 154, and object manager 156. Data 158 is input to object detector 152. Data 158 may include an image, video, audio clip, and/or other data. Object detector 152 performs an object detection process to detect occurrences of detection objects in data 158. Object detector 152 may detect any occurrence of a detection object (e.g., any face). Object detector 152 provides detected objects 162 as output.

Objects 162 are provided as input to object identifier 154, which identifies detection objects. For example, object detector 152 may detect any face, and object identifier 154 may identify the face as belonging to a specific person. Object identifier may output one or more names associated with one or more of objects 162. In some embodiments, object identifier 154 assigns a tag (such as the tag "Bob") to an object. Objects 162 and the output of object identifier 154 are provided as input to object manager 156. User input 164 may also be provided as input to object manager 156.

Object manager 156 manages objects 162, including organizing, tagging, and displaying information associated with objects 162 on display 160. For example, object manager 156 may determine correspondences between objects detected from similar images. Object manager 156 may manage the display of corresponding objects and other information.

Figure 2:
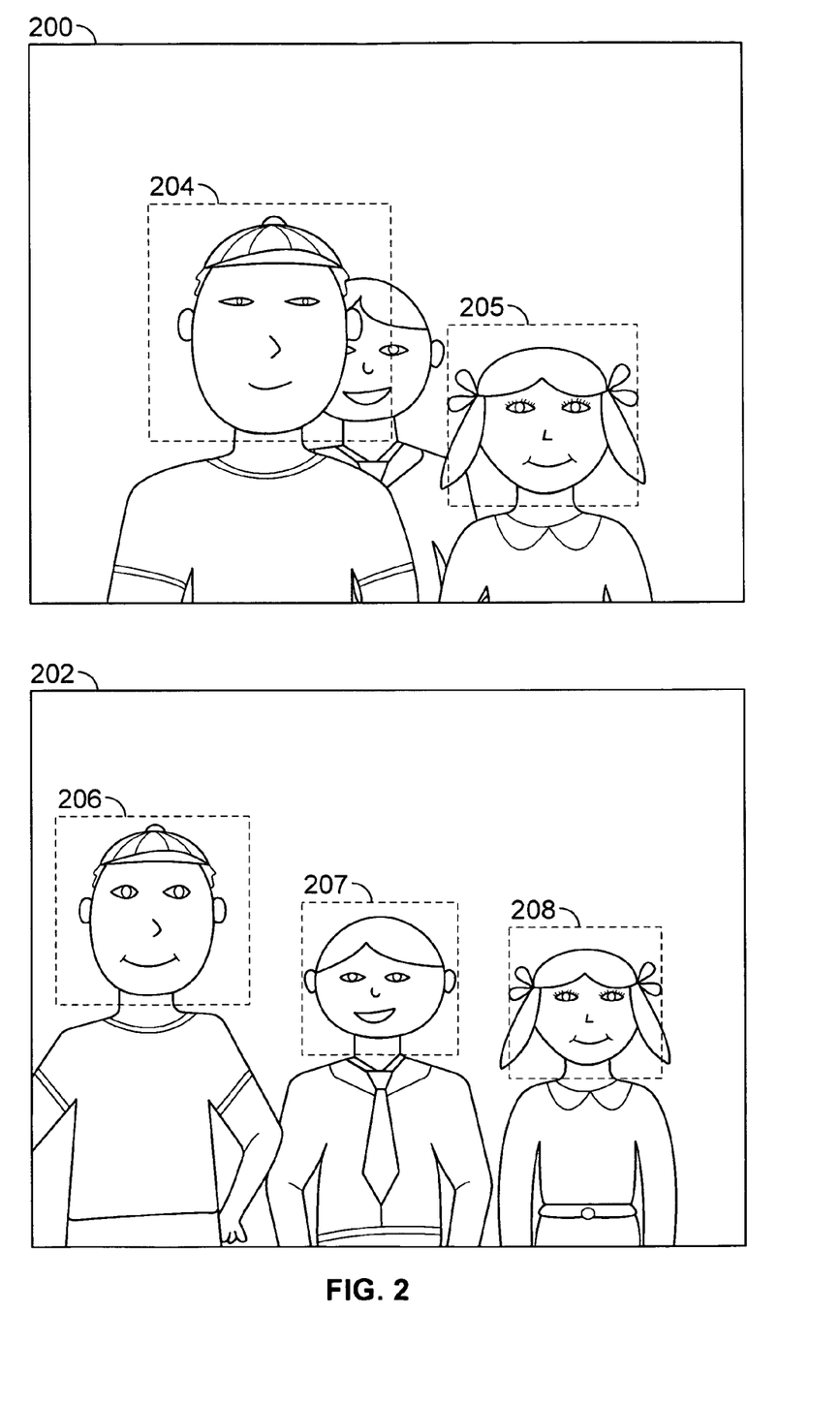
FIG. 2 illustrates an embodiment of similar images and objects detected from those images.

FIG. 2 illustrates an embodiment of similar images and objects detected from those images. In the example shown, images 200 and 202 are similar to each other and depict some items in common, in this case the three people shown. A photographer may have taken multiple shots and generated similar images 200 and 202; or, two photographers may have taken photographs of the same scene. Objects 204 and 205 are associated with image 200, and objects 206-208 are associated with image 202. In some embodiments, an automatic detection process detects all of the objects. In some embodiments, at least one of the objects is manually detected. A user may examine an image, detect an occurrence of a detection object, and specify the portion of the image associated with the new object.

If a user is in possession of similar images, she may want to select the best overall image. A user may prefer image 202 over image 200 because the person depicted in object 204 is blinking. Furthermore, the person depicted in the middle of image 200 is partially blocked and there is no object associated with his face. In image 202, none of the people are blinking, looking away from the camera, or are blocked and all of the faces depicted are associated with an object.

In some embodiments, a user indicates that two or more images are similar. A user may view a collection and select similar images from the collection. In some embodiments, similar images are identified automatically. A process may

TABLE 1

| Object ID | Source File ID | Coordinates of Origin | Width | Height | Angle | P(Object = Detection Object) | Date Object Detected | User or Auto Detected | Date/time of image capture |
|---|---|---|---|---|---|---|---|---|---|
| 1 | 1 | x0, y0 | 5 | 8 | 0 | 0.8 | 1/1/05 | Auto | 12/16/04 |
| 2 | 1 | x1, y1 | 5 | 7 | 0 | 0.7 | 1/1/05 | Auto | 12/16/04 |
| 3 | 1 | x2, y2 | 1 | 1 | 0 | 0.5 | 1/1/05 | Auto | 12/16/04 |
| 4 | 2 | x3, y3 | 2 | 2 | 10 | 0.6 | 11/2/05 | Auto | 7/10/04 |
| 5 | 2 | x4, y4 | 3 | 4 | 20 | 0.7 | 11/2/05 | Auto | 7/10/04 |
| 6 | 2 | x5, y5 | 1 | 1 | 0 | 1 | 11/22/05 | User | 7/10/04 | evaluate images in a collection and identify images in the collection that are similar to each other. In some cases, the process may be passed an input image and the process identifies other images that are similar to the input image. Information that a process may use in identifying similar images include time/date information. For example, a photographer may take multiple shots of a scene. The time and date of the images may be close to each other, for example on the order of a few seconds (perhaps in the case of action shots of sports scenes) or a minute (perhaps in the case of a group photograph). In some embodiments, other information associated with the images is compared. For example, lighting or colors depicted in the images or tags assigned to the object or the image may be used to identify similar images.

By displaying objects from similar images so that correspondence(s) between objects are conveyed, a user may be able to select the best overall image. For example, by viewing such a display, a user may be able to determine that the man depicted in object 204 is blinking whereas the man in object 206 is not blinking. A user may be able to determine that image 202 is preferable compared to image 200. In some embodiments, not all of the objects associated with similar images are displayed. In some embodiments, a display conveys that object 207 has no corresponding object. The correspondence can be displayed in a structured manner (for example in a row, a column, or a two dimensional array). Displaying objects as described may be useful if there are many objects associated with an image, or the occurrence of a detection object is small within an image. For example, in a group photograph there may be many detected objects and/or the dimensions of the detected objects may be quite small. It may be difficult for a user to see how people (or other detection object, depending upon the embodiment) are depicted.

Displaying objects as described may be used for a variety of other functions besides selecting a best overall image. In some applications, a user may want to review the performance of an automatic detection process. By conveying correspondence(s) between objects, a user may realize that the man depicted in the middle of image 200 is undetected. A user may subsequently rerun the automatic detection process with difference performance parameters (for example, improved performance at the expense of processing time), or may manually detect the man in the middle by drawing a box around his face or performing another appropriate sequence of inputs associated with manual detection.

In some embodiments, one or more of the displayed objects is selected and some action is performed on the selected object(s). For example, a user may want to save the best object from each group of corresponding objects. Of objects 204 and 206, object 206 may be selected to be saved since the man depicted in object 206 is not blinking The selected object may be saved to a file, such as a face book, or a library used to store objects. In some embodiments, an image may be given a ranking to allow for rating an overall image, based on objects selected. In some embodiments, a new, composite image is generated. It may be that all of the similar images contain at least one undesirable or unflattering depiction. For example, the girl depicted in object 208 may be looking away from the camera. A new composite image based on image 202 with object 205 used in place of object 208 may be created. An image with an undesirable depiction, such as image 200, can be selected and deleted by a user. Deleting an image may delete objects associated with that image.

Although two similar images are shown in this example, in some embodiments there are three or more similar images. The techniques described for this example and subsequent examples may be appropriately modified to accommodate three or more similar images. For example, if there is a third image with all three people depicted, object 204, object 206, and a corresponding object in the third image may be displayed with their correspondence conveyed by the display.

Figure 3:
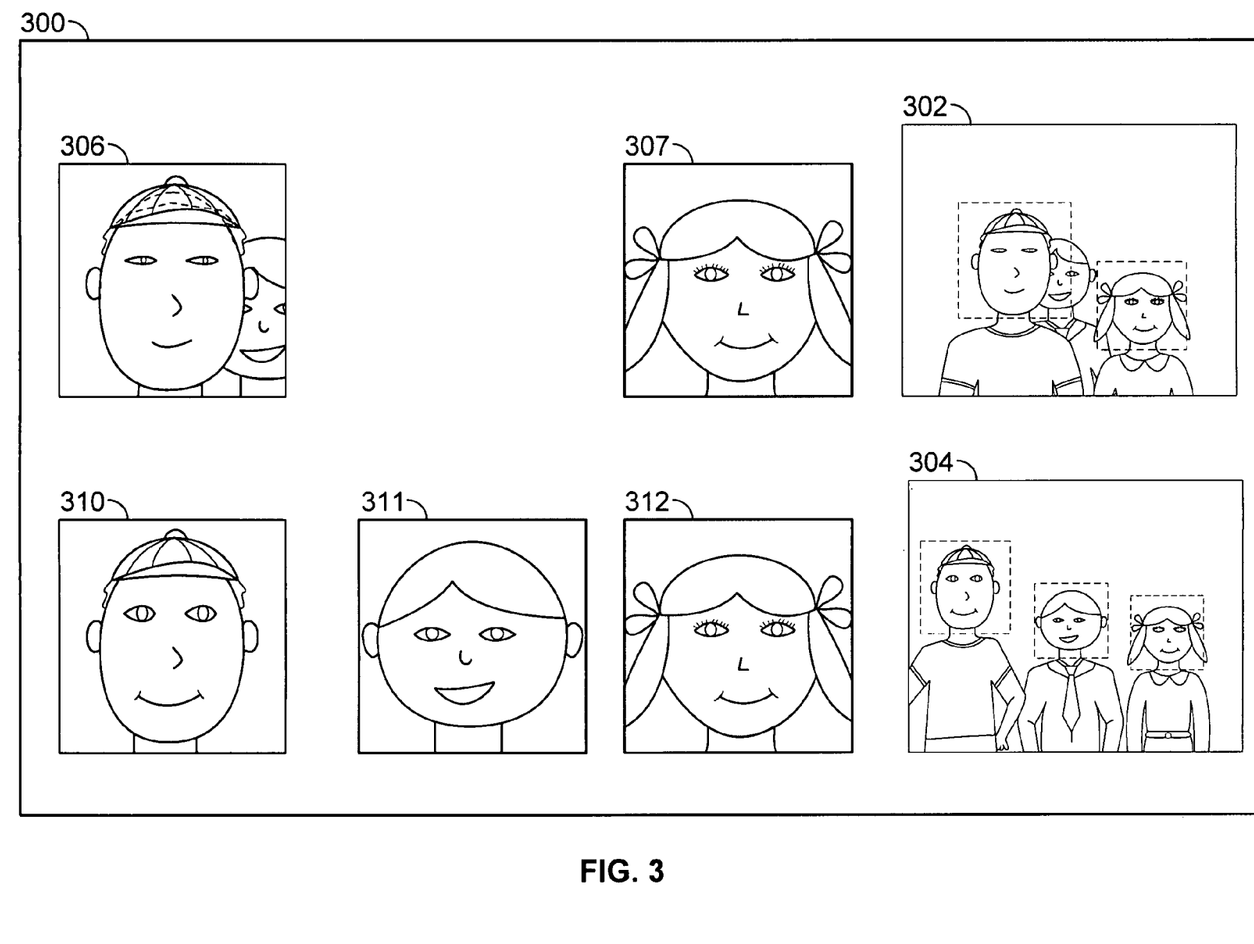
FIG. 3 is a diagram illustrating an embodiment of a display that conveys correspondences between objects detected from similar images.

FIG. 3 is a diagram illustrating an embodiment of a display that conveys correspondences between objects detected from similar images. In the example shown, all objects detected from images 302 and 304 are presented in display 300. Objects 306 and 307 are detected from image 302, and objects 310-312 are detected from image 304. Each object is displayed in the same row as its associated image. Groups of corresponding objects are displayed in the same column where the vertical alignment of objects indicates which object(s) a given object corresponds to. Corresponding objects 306 and 310 are displayed in the same column, object 311 has no corresponding object and is displayed in its own column with an empty region above it, and corresponding objects 307 and 312 are displayed in the same column.

Objects may be substantially aligned, since the human eye may not be able to discern deviations in alignment. For example, a user may not be able to detect if objects 307 and 312 deviate from a line if the deviation is on the order of a few millimeters. The scale may depend upon the display size of the objects. Note that display size refers to the dimensions of an object in a display such as display 300, as opposed to the dimensions of an object within the context of its image. Objects with relatively large display sizes may be substantially aligned even if they deviate from a line by more than a few millimeters.

In some embodiments, the orientation is reversed. Objects that correspond to each other are displayed in the same row. Each image and its objects are displayed in the same column. In some embodiments, multiple groups of corresponding objects share a column. For example, object 311 may be displayed in the same column as objects 306 and 310.

In some embodiments, not all objects detected from similar images are displayed. For example, some displays may only present objects 306 and 310. In some embodiments, all objects that have at least one corresponding object are displayed. Objects 306, 307, 310 and 312 may be displayed, but object 311 may not necessarily be displayed. In some embodiments, an object is not displayed because of its position or location with respect to other objects and/or the dimensions of the object compared to the dimensions of other objects. For example, in image 100, the man depicted in object 104 is not intended to be part of the picture. In some embodiments, object 104 is not displayed because it is located relatively far away from objects 102 and 106, it is located on the edge of image 100, and/or the dimensions (e.g., the height and/or width) of object 104 are relatively small compared to the dimensions of objects 102 and 106.

In this example, objects 306, 307, and 310-312 are normalized and displayed as the same size, even though they may not necessarily have the same dimensions. Different dimensions may result from the photographer moving, the people depicted moving, or different zoom settings of the camera. In some embodiments, objects are not normalized. For example, a user may care more about certain objects. It may be difficult to perceive that a person depicted in an object with very small dimensions is blinking or looking away, such as object 104 in image 100. A user may care more about how people are depicted in objects with larger dimensions, such as objects 102 and 106. Larger objects can be displayed larger than objects with smaller dimensions. This may be particularly useful if the images from which the objects are detected are not displayed. In some embodiments, corresponding objects across images a normalized in a common manner. For example, objects 306 and 310 may be normalized and displayed as the same size. Objects 307 and 312 may also be normalized and displayed as the same size, although not necessarily the same size as objects 306 and 310.

In this example, there is at most a one to one correspondence between objects. That is, a given object associated with a first image corresponds to at most one object associated with a second image. Conversely, a given object associated with the second image corresponds to at most one object associated with the first image. If a given object is not associated with any other object, the restriction is satisfied. In some embodiments, there is no such restriction. For example, object 306 may correspond to both objects 310 and 311.

The ordering of the objects in display 300 in this example follows the placement of objects within the associated image. For example, the objects going from left to right along the top row of display 300 are: object 306 and object 307. This ordering follows the placement of those objects in image 302. Similarly, objects 310-312 are displayed in the same ordering as in image 304. In some embodiments, objects are displayed in a different order. In one example, objects are displayed according to a confidence or a probability that a given correspondence is correct. Objects that do not correspond to any other object may be displayed at one end. If the highest confidence level is associated with the correspondence between objects 307 and 312, the objects along the top row going from left to right may be: object 307, object 306, an empty region, and image 302. The bottom row going from left to right may be: object 312, object 310, object 311, and image 304. The ordering may also be reversed.

In some embodiments, visual effects are used in display 300. A unique visual effect can be used for each group of corresponding objects. For example, a border in a first color can be used for corresponding objects 306 and 310, a second color for object 311, and a third color for corresponding objects 307 and 312. In some embodiments, lines are used to connect corresponding objects. Visual effects in some embodiments can be applied to the rectangles displayed in images 302 and 304. For example, the rectangles corresponding to objects 306 and 310 may have a border in a first color. In some embodiments, the visual effect is a time varying effect, where an object or a border associated with an object blinks, pulsates, or changes color/shape over time.

Display 300 in some embodiments may be incorporated into a user interface. A user interface which includes display 300 may have buttons, toolbars, or pull down menus which may be used to perform a variety of actions. For example, a user may select object 310 and apply a tag with a tag word of "Bob." A user may select image 302 and delete it. Objects 306 and 307 which are associated with image 302 may also be deleted if image 302 is deleted or omitted. Object 311 may be a desirable depiction of the person, and a user may select and save object 311 to a new file. A user may be able to add another image to display 300 using a user interface. The new image may be specified using the user interface and objects associated with the new image may be evaluated and added to an appropriate column based on which objects they correspond to. A user may be able to cause display 300 to stop displaying some objects or images. A user may be able to manipulate the placement of objects or images in display 300. For example, a user may be able to move object 311 to the empty region between objects 306 and 307, or move image 304 to the left of object 310. In some embodiments, if one object in a group of corresponding objects is moved, all objects in that group may be moved. For example, if a user selects and moves object 306, object 310 may follow so that the same relative positioning and distance is maintained between objects 306 and 310.

Display 300 may in some cases be presented some time after processing to determine corresponding objects is performed. For example, a process may store information that indicates which objects correspond to each other. This information may be stored as metadata with the file, in a table, in a database, or any other appropriate storage. Some time after the process is performed, the stored information may be retrieved and display 300 may be presented to a user. In some embodiments, display 300 is presented on a different device than the device that determined corresponding objects. For example, information that indicates which objects correspond to each other may be stored by a first device as metadata with an image file. The image file (including the metadata) may be transferred to a second device. The second device may retrieve the metadata and display corresponding objects using a display such as display 300.

In some embodiments, images 302 and 304 are not displayed or are displayed slightly differently. The size of display 300 may be limited in some applications, in which case images 302 and 304 may not necessarily be displayed. In some embodiments, images 302 and 304 are displayed without rectangles indicating the boundaries of objects. In some embodiments, one or more of the objects can be selected. Rectangles in some embodiments are only displayed for those objects that are selected, if any. Unselecting an object may cause the associated rectangle to be removed from its associated image.

Figure 4:
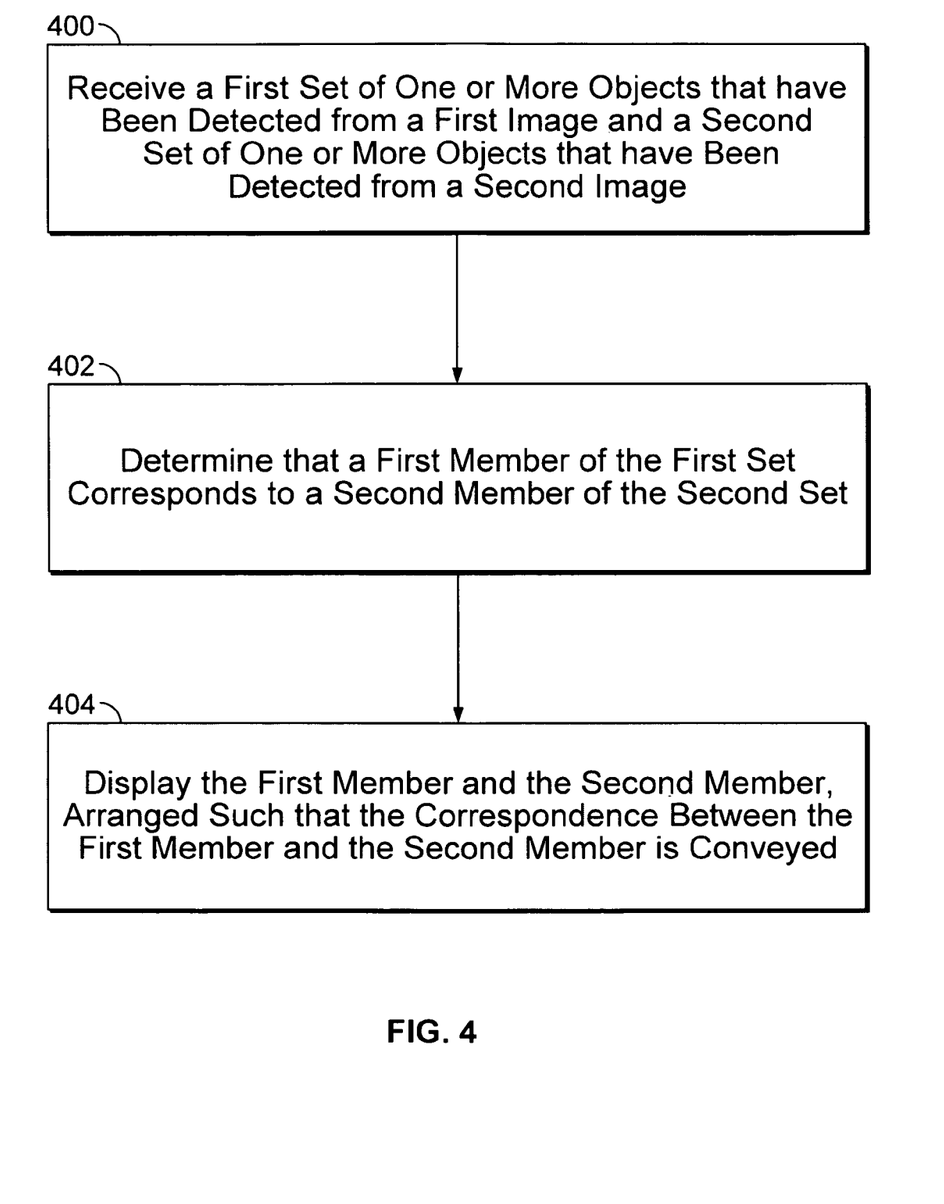
FIG. 4 is a flowchart illustrating an embodiment of determining and displaying a correspondence between two objects, each detected from similar images.

FIG. 4 is a flowchart illustrating an embodiment of determining and displaying a correspondence between two objects, each detected from similar images. In the example shown, the process may be used to determine which objects correspond to each other, such as objects 306 and 310, and display the corresponding objects. Although this example describes determining and displaying a single group of corresponding objects, multiple groups of corresponding images may be determined. In some embodiments, objects from three or more similar images are evaluated.

At 400, a first set of one or more objects that have been detected from a first image and a second set of one or more objects that have been detected from a second image are received. In some embodiments, unique object identifiers may be obtained at 400. A unique object identifier may be used to locate an object and/or obtain information associated with the objects. For example, information resulting from an automatic detection process may be stored in a database, library, table, or other suitable storage method, and the object identifier may be used to retrieve this information.

The first and second images may be similar to each other. In some embodiments, the first and second images are identified by a user. In some embodiments, the first and second images are automatically identified. Similar images may, for example, be characterized by similar colors in corresponding regions of an image, the number of objects, and/or the coordinates of objects. An automatic image matching process may attempt to identify similar images using these or other characteristics. In some embodiments, tags (assigned to an object or an image) or the time at which an image is created may be used to determine if two images are similar to each other.

It is determined at 402 that a first member of the first set corresponds to a second member of the second set. In some embodiments, spatial information associated with the objects s used to determine a correspondence between objects. Spatial information may include location or position information, such as an object's coordinates, or the size or dimensions of an object. In some embodiments, a correspondence is determined by an object matching process, such as a face matching process. In some embodiments, objects are identified using an object identification process. Objects that are identified to be the face of the same person may be determined to correspond.

The first member and the second member are displayed at 404, arranged such that the correspondence between the first member and the second member is conveyed. In the example of display 300, correspondence between objects is displayed by the vertical alignment of corresponding objects.

Figure 5:
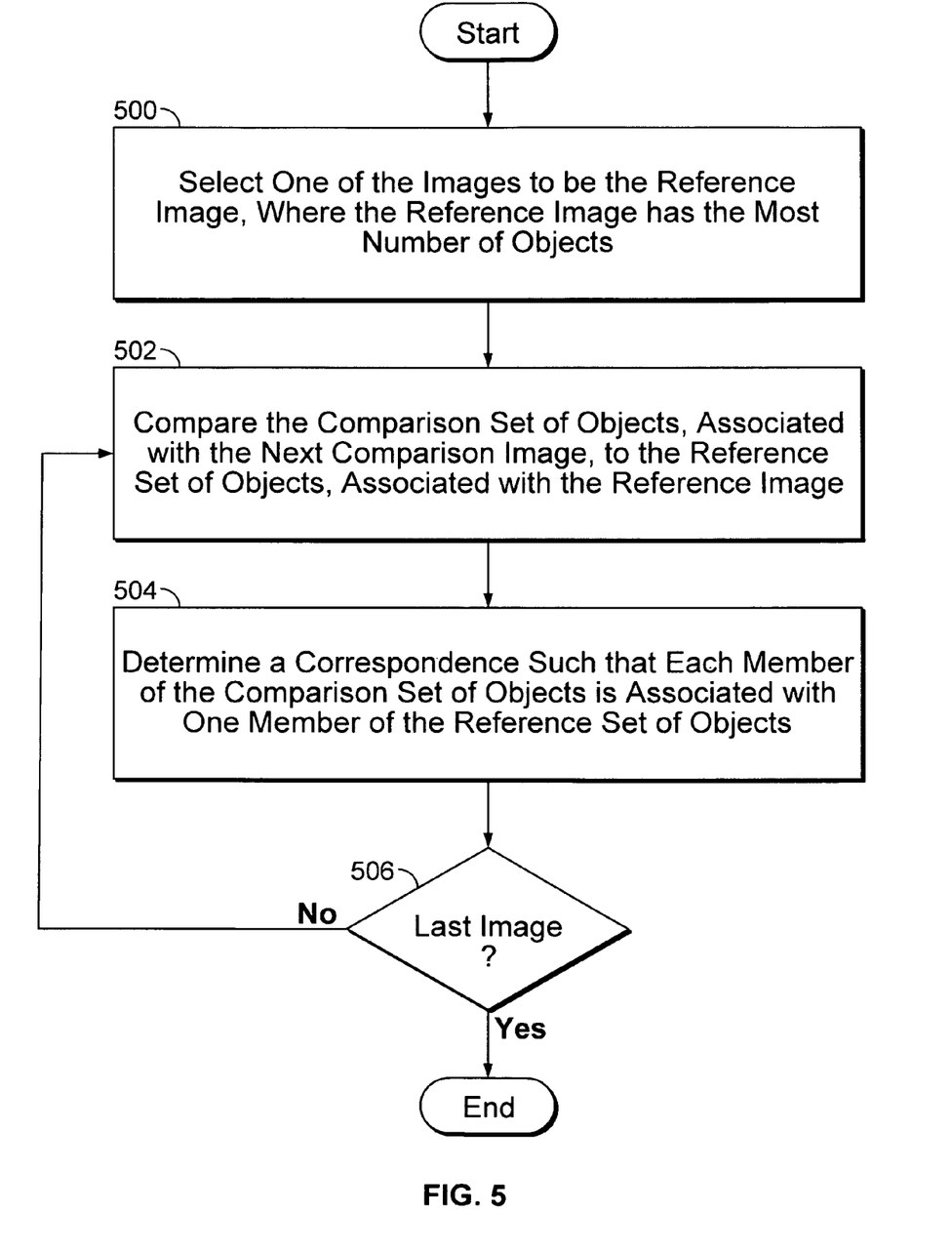
FIG. 5 is a flowchart illustrating an embodiment of determining a correspondence between objects detected from similar images.

FIG. 5 is a flowchart illustrating an embodiment of determining a correspondence between objects detected from similar images. In the example shown, the process may be used to perform 402 of the previous example. Objects detected from two or more similar images may be processed. At 500, one of the images is selected to be the reference image, where the reference image has the most number of objects. For example, image 202 has three objects associated with it, whereas image 200 has two objects associated with it. Image 202 is selected to be the reference image.

The comparison set of objects, associated with the next comparison image, is at 502 compared to the reference set of objects, associated with the reference image. For example, objects 204 and 205 comprise the comparison set of objects, and objects 206-208 comprise the reference set of objects. Spatial information associated with the objects may be used in the comparison.

At 504, a correspondence is determined such that each member of the comparison set of objects is associated with one member of the reference set of objects. In this example, there is at most a one to one correspondence between objects in the comparison set and the reference set. That is, two comparison objects (associated with the same comparison image) may not correspond to the same reference object in this example. Conversely, a comparison object may not correspond to multiple reference objects. In some cases, this is enforced by initially permitting a conflict (e.g., a two to one correspondence) and then resolving conflicts, if any. For example, if objects 204 and 205 both correspond to object 207, a resolution process may be performed. In some cases, a conflict is not permitted, even temporarily. For example, once it is determined a given reference object corresponds to a comparison object, that reference object may be removed from consideration. The remaining reference objects are used in determining subsequent correspondences. In some embodiments, there is no restriction limiting corresponding objects to have at most a one-to-one relationship.

It is decided at 506 whether the current comparison image is the last image. If it is the last image, the process concludes. Otherwise, the comparison set of objects for the next comparison image is compared to the reference set of images at 502.

Although an image or an object may have a designation of "reference" or "comparison," the designations do not necessarily affect placement within a display. The output of the process illustrated may comprise solely of the correspondences between objects. Information identifying a particular image or object as "reference" or "comparison" may be discarded at the end of the process.

In some embodiments, spatial information is used in steps 502 and 504 to compare objects and determine a correspondence. The following figures illustrate some embodiments of using spatial information to determine a correspondence.

Figure 6:
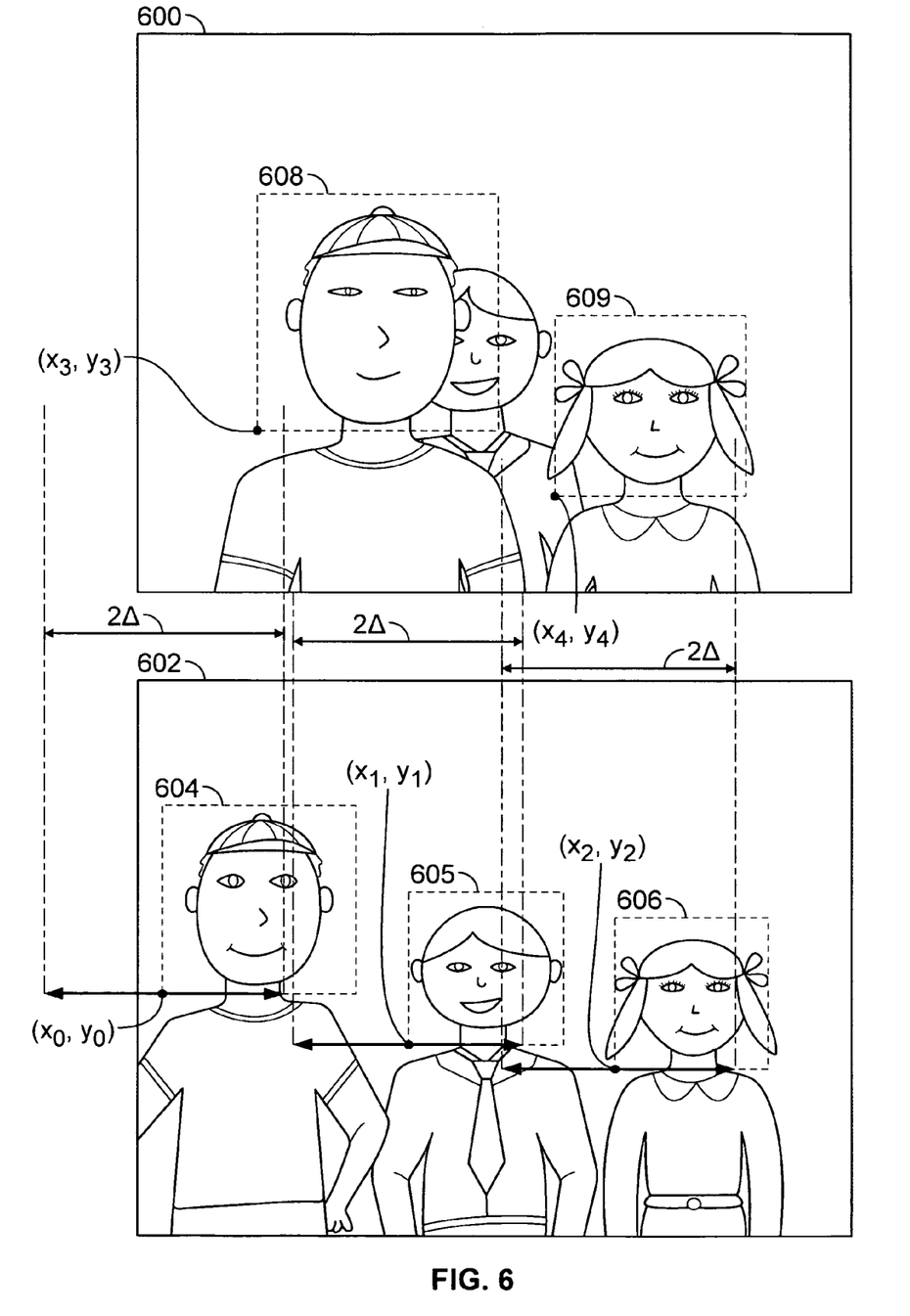
FIG. 6 is a diagram illustrating an embodiment of determining correspondences between objects based on coordinates and a tolerance.

FIG. 6 is a diagram illustrating an embodiment of determining correspondences between objects based on coordinates and a tolerance. In the example shown, image 600 is a comparison image and image 602 is a reference image. Image 602 is selected to be the reference image since it has the most number of objects associated with it. Reference objects 604-606 are associated with image 602 and the coordinates of the reference objects are used to determine correspondences.

The coordinates $(x_0, y_0)$, $(x_1, y_1)$, and $(x_2, y_2)$ describe the location of the lower left corner of reference objects 604-606 with respect to the origin of image 602. In this example, correspondences are determined using a single dimension. The x coordinates are obtained for the reference objects, and a range of values $(x-\Delta)$ through $(x+\Delta)$ is defined for each reference object. If the x coordinate of a comparison object falls within one of the ranges, a correspondence is determined between that comparison object and the reference object.

In the example shown, comparison objects 608 and 609 have coordinates $(x_3, y_3)$ and $(x_4, y_4)$, respectively. The x coordinate of comparison object 608, $x_3$, falls within the range $(x_0-\Delta)$ through $(x_0+\Delta)$. A correspondence between object 608 and object 604 is therefore determined. The x coordinate of comparison object 609, $x_4$, falls within the range of $(x_2-\Delta)$ through $(x_2+\Delta)$ and a correspondence between objects 609 and 606 is declared. The x coordinate of no object falls within the range associated with object 605, so no object is determined to correspond to object 605.

$\Delta$ may be referred to as a tolerance and may be used to account for location differences of objects between similar images. For example, a photographer may have taken images 600 and 602. Between capture of the images, the photographer may move the camera or adjust the camera's zoom setting. Alternatively, the people depicted in images 600 and 602 may have moved between capture of the images. A tolerance may be used to account for these changes between similar images.

The tolerance value used may depend on a variety of factors. In some embodiments, a fixed tolerance value is used. In some embodiments, the value of $\Delta$ is based on the number of objects associated with the reference image and/or the comparison image. In some embodiments, multiple tolerance values are used; a range of $(x-\Delta^-)$ through $(x+\Delta^+)$ may be defined. In some embodiments, a tolerance value is based on one or more of the coordinates. For example, image 602 may be divided into adjacent, non-overlapping rows that encompass all of image 602. Three ranges of: the left hand edge of image 602 through $$\frac{x_0 + x_1}{2}, \frac{x_0 + x_1}{2}$$

through $$\frac{x_1 + x_2}{2},$$

and $$\frac{x_1 + x_2}{2}$$

through the right hand edge of image 602 may be defined. In some cases, very consistent coordinates may result from certain similar images. For example, images generated by a photographer using a tripod may have objects with very consistent coordinates. A tolerance value in some embodiments is based on an average or median difference between a reference object's coordinates and a comparison object's coordinates. In some embodiments, tolerance varies in accordance with a size or dimension. For example, a small object may have a smaller tolerance than a larger object.

Using this technique, there may be some comparison objects for which no correspondence is determined, perhaps because that comparison object did not fall into any of the ranges. Additional processing may be performed on those remaining comparison objects to determine correspondences for them. In some cases, two comparison objects (associated with the same comparison image) may correspond to the same reference object, or a given comparison object may correspond to multiple reference objects. In some embodiments, additional processing is performed to resolve these issues. One of the other techniques that use spatial information or another technique may be used.

Figure 7:
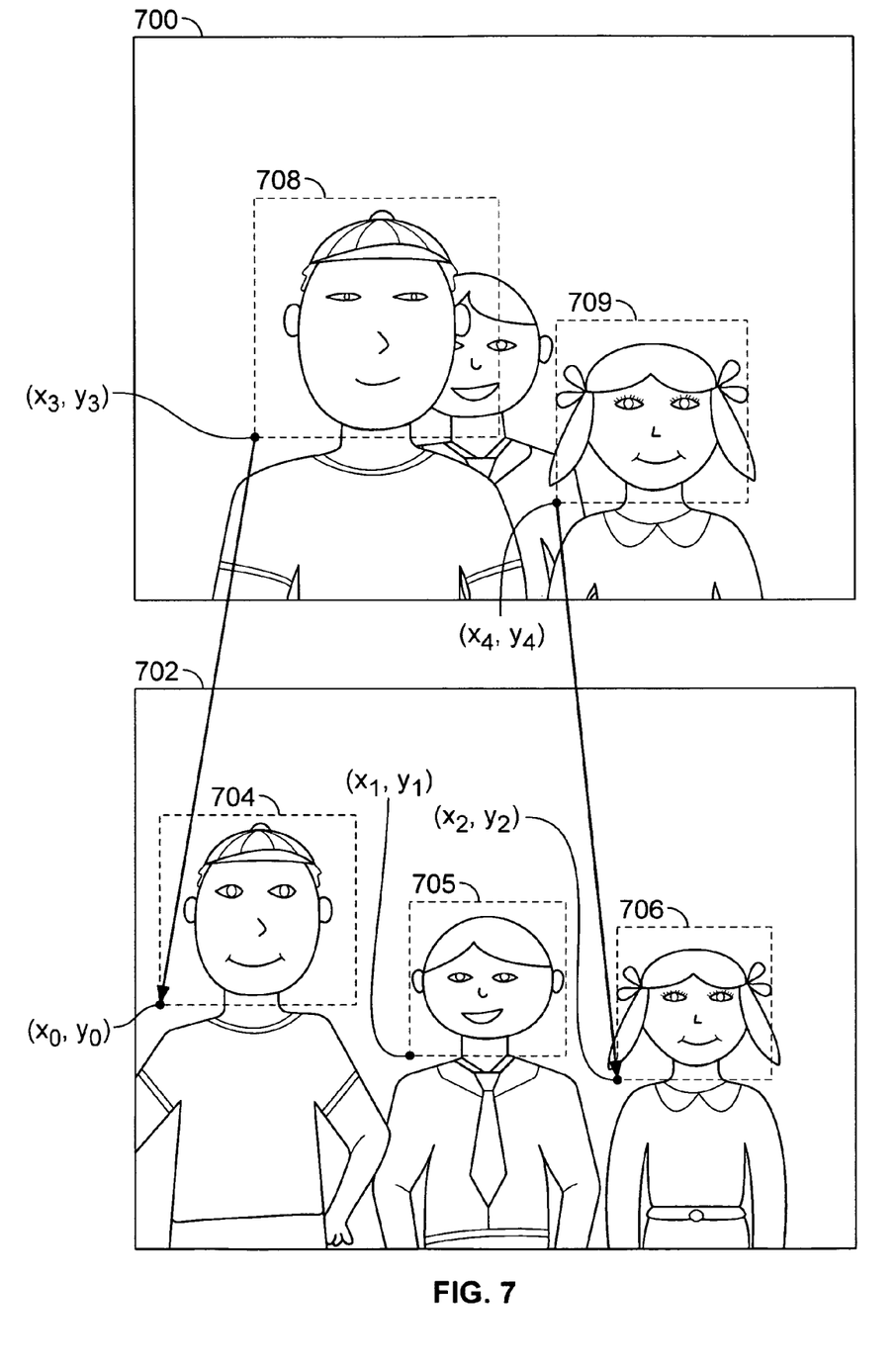
FIG. 7 is a diagram illustrating an embodiment of determining correspondences between objects based on proximity.

FIG. 7 is a diagram illustrating an embodiment of determining correspondences between objects based on proximity. In the example shown, correspondences are determined based on which reference object is closest to a given comparison object. Image 702 is selected to be the reference image since it has the most objects associated with it.

Comparison object 708 has coordinates $(x_3, y_3)$. The reference object with the closest x coordinate to comparison object 708 is determined to correspond to it. This may be performed by finding the minimum difference between x coordinates: $\min(|x_0-x_3|, |x_1-x_3|, |x_2-x_3|)$. The x coordinate of reference object 704, $x_0$, is the closest in value to $x_3$ (the x coordinate of comparison object 708) and a correspondence between objects 708 and 704 is determined.

The same process may be performed for comparison object 709. Using $x_4$ (the x coordinate of comparison object 709) the reference object with the closest x coordinate may be found. The x coordinate $x_2$ is closest in value to $x_4$, so a correspondence between objects 709 and 706 is determined. In some embodiments, geo-positioning data and/or depth information (e.g., with respect to the camera) may be used to determine corresponding objects.

In some cases, two comparison objects may map to the same reference object. As with the previous example, subsequent processing may be performed to resolve any conflicts. In some embodiments, a process that uses spatial information is subsequently performed. In some embodiments, another technique (such as an object matching process) is performed.

Figure 8:
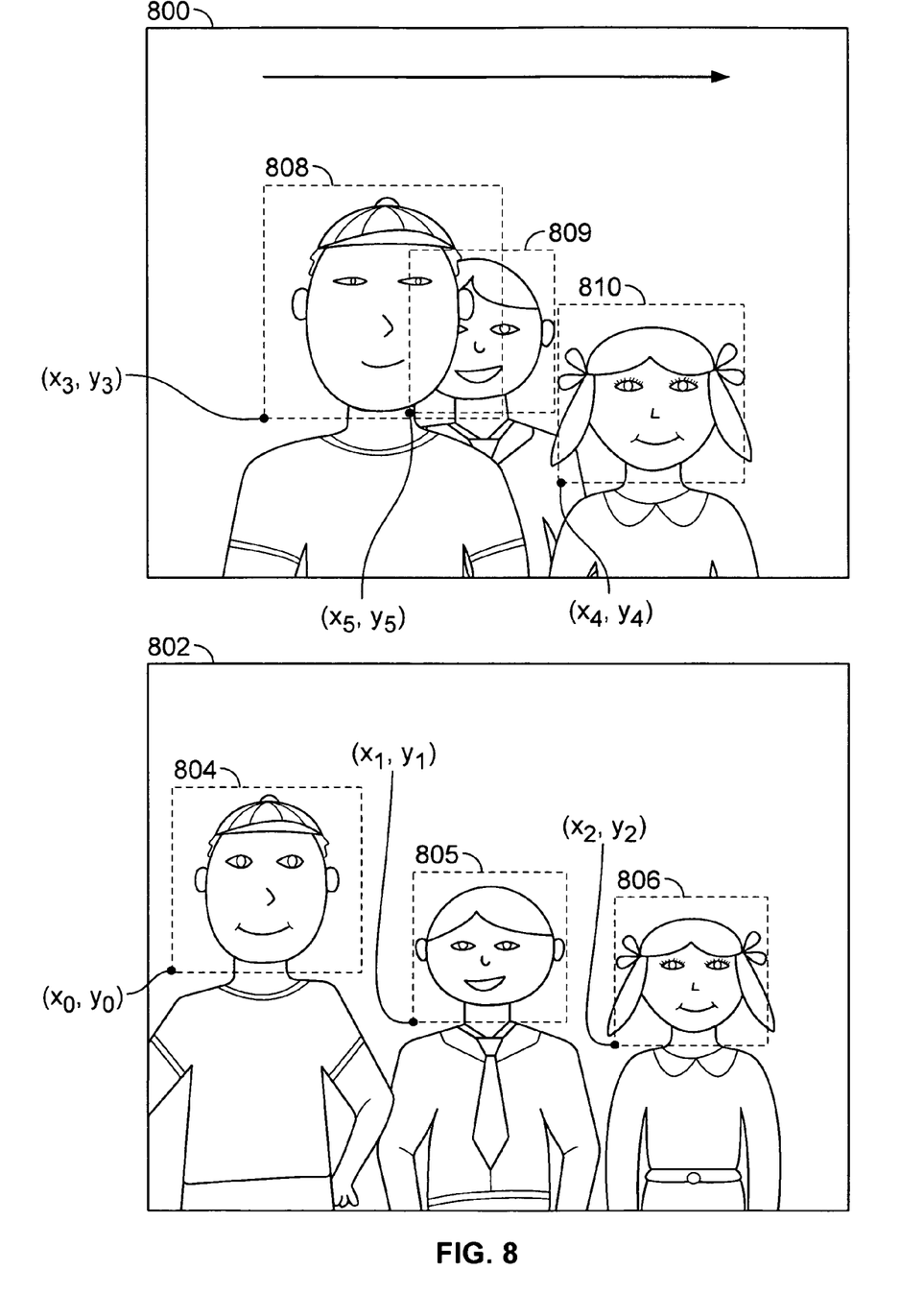
FIG. 8 is a diagram illustrating an embodiment of determining correspondences between objects based on an ordering.

FIG. 8 is a diagram illustrating an embodiment of determining correspondences between objects based on an ordering. In the example shown, image 800 and image 802 have the same number of objects associated with them. Image 802 is selected to be the reference image, although in some cases image 800 may be selected as the reference image. Correspondences are determined between objects based on the horizontal ordering of objects. That is, the leftmost comparison object, object 808 in this example, corresponds to the leftmost reference object, object 804. The next comparison object, object 809, corresponds to reference object 805 and the rightmost comparison object, object 810, corresponds to reference object 806.

In some embodiments, determining a correspondence based on an ordering is used when there are an equal numbers of objects. In such cases, if there are an unequal numbers of objects, another method is used to determine correspondences.

A number of examples to determine correspondences between objects using spatial information have been described. In some embodiments, multiple techniques are used. For example, an initial process may be used to determine initial correspondences, and a second process may be performed subsequently. In some embodiments, a subsequent process evaluates all objects and correspondences determined by an initial process. In some embodiments, a subsequent process evaluates a subset of objects or correspondences. For example, comparison and reference objects without a corresponding object, and/or conflicting correspondences are passed to a subsequent process.

In some embodiments, an object matching process is used to determine a correspondence between objects. For example, a face matching process may be used to examine objects and determine which objects contain similar or matching faces. In some embodiments, a face matching process is relied upon solely to determine correspondences between objects. In some embodiments, a face matching process is used in combination with another method, such as using spatial information, to determine correspondences between objects. In one example, coordinates are used to determine an initial correspondence. The correspondences may be verified by the face matching process, and/or the face matching process may be used to resolve any conflicts that may result from using spatial information.

Figure 9:
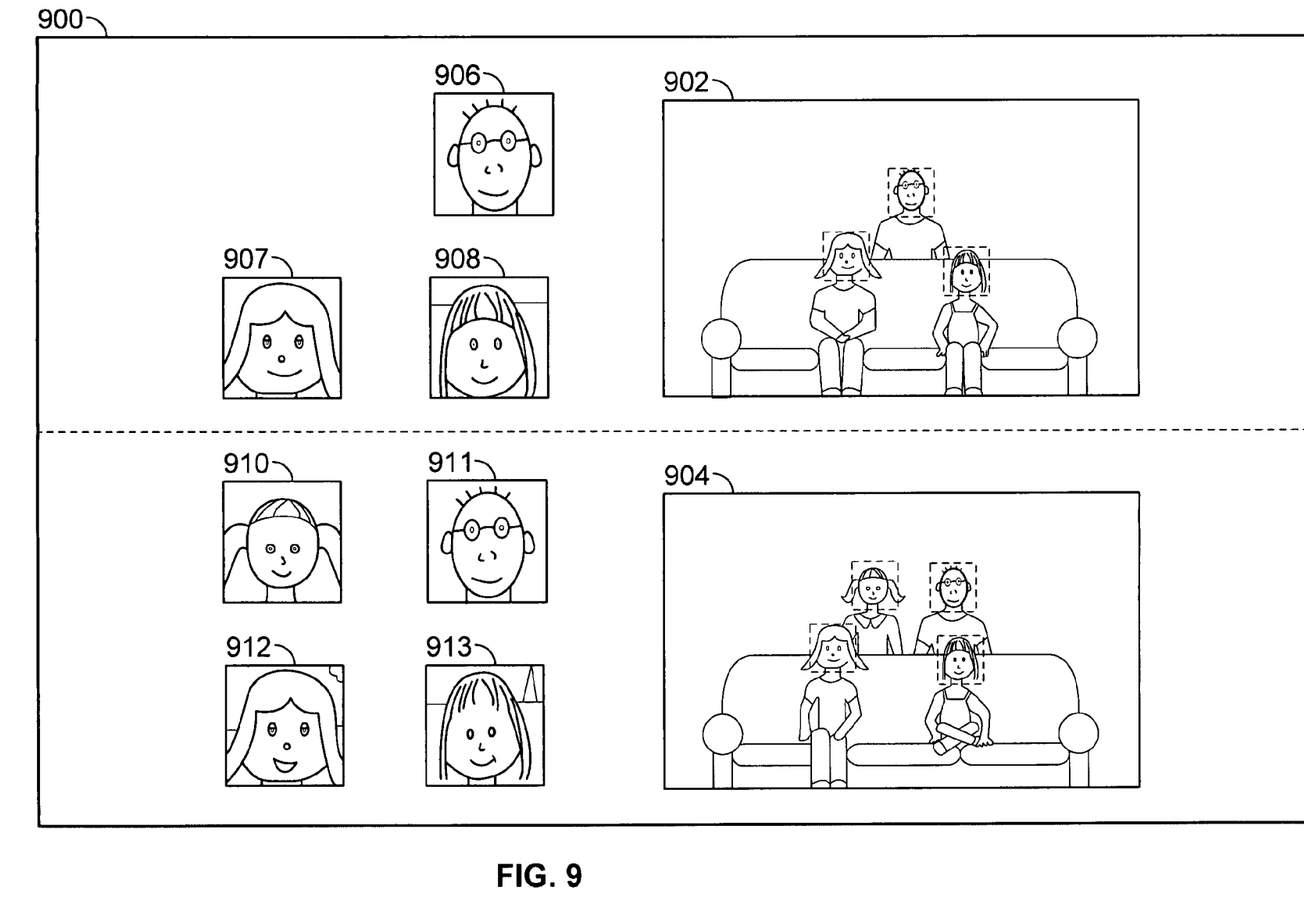
FIG. 9 is a diagram illustrating an embodiment of a display that shows corresponding objects in a two dimensional array.

FIG. 9 is a diagram illustrating an embodiment of a display that shows corresponding objects in a two dimensional array. In the example shown, the images 900 and 902 are similar to each other and contain some people in common. Techniques described above to determine correspondences may be used. For example, image 904 may be selected as a reference image and spatial information associated with the objects may be used to determine correspondences.

The techniques described above may be modified as appropriate to use y coordinates of objects. Corresponding objects may be determined based on x and/or y coordinates. For example, the closest reference object in an x-y plane may correspond to a given comparison object. In some embodiments, reference image 904 and comparison image 902 are divided into identical grids. A reference object and a comparison object in the same square of the grid as may correspond to each other.

Next to each image is a two dimensional array of objects associated with that image. Objects 906-908 are detected from image 902, and objects 910-913 are detected from image 904. The placement of an object in the two dimensional array indicates the correspondence between objects. Objects 906 and 911 correspond to each other and are both in the top row, right column of their respective two dimensional arrays. Corresponding objects are placed in the same position. Objects 907 and 912 correspond to each other, and objects 908 and 913 correspond to each other. Object 910 does not correspond to any object in image 902, and an empty region is displayed in the top row, left column to indicate that no object corresponds to object 910.

In some embodiments, a display may vary from that of display 900. For example, objects 906-908 and objects 910-913 may have colored borders. A unique color may be used for each group of corresponding objects. A first color may be used for corresponding objects 906 and 911, a second color for corresponding objects 907 and 912, etc. In some embodiments, a different alignment is used for the objects. For example, objects 906, 910, and 911 may be shifted to the right. Object 910 would no longer be displayed between objects 907 and 912, and object 911 would no longer be displayed between objects 908 and 913. By shifting the placement of some objects in display 900, a user may be able to more quickly or easier observe differences between corresponding objects, or distinguish between groups of corresponding objects.

In some embodiments, a two dimensional array is used to display corresponding objects even if an image does not necessarily suggest a multi-row arrangement. For example, the images may be two group photographs where all of the people are approximately the same height and are standing next to each other. However, the width of a display may be narrow. To accommodate the width of a display, a two dimensional array may be used to display corresponding objects, even though the objects in the image are substantially in a single row. As the display becomes narrower, the number of objects displayed per row may decrease, and the number of objects displayed per column may increase.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving a first set of one or more subimages associated with a first image and a second set of one or more subimages associated with a second image;
   determining, using a processor, that a first subimage of the first set corresponds to a second subimage of the second set based at least in part on spatial information associated with the position of the first subimage in the first image, including by:
      dividing the first image into a first grid; and
      dividing the second image into a second grid, wherein the first subimage and the second subimage occupy corresponding elements of the first grid and the second grid;
   associating the first subimage with the second subimage using the processor; and
   displaying the first subimage in a first region of a display and the second subimage in a second region of the display, wherein the position of the first subimage within the first region substantially matches the position of the second subimage within the second region.

2. A method as recited in claim 1, wherein the first subimage and the second subimage are substantially aligned.

3. A method as recited in claim 1, wherein associating includes saving metadata that indicates the first subimage corresponds to the second subimage.

4. A method as recited in claim 1, wherein the first subimage includes an occurrence of a face.

5. A method as recited in claim 1, wherein the first subimage includes at least one of the following: an object detected from the first image, an object automatically detected from the first image, or a portion of the first image selected by a user.

6. A method as recited in claim 1, wherein the spatial information includes a dimension and/or one or more coordinates.

7. A method as recited in claim 1, wherein determining is further based at least in part on an automatic matching process.

8. A method as recited in claim 1, wherein determining includes determining which subimage of the first set is located closest to the second subimage of the second set.

9. A method as recited in claim 1, wherein determining includes selecting a reference image based at least in part on the number of subimages in the first set.

10. A method as recited in claim 1 further including displaying the first image.

11. A method as recited in claim 1, wherein there is at most a one to one correspondence between subimages in the first set and subimages in the second set.

12. A method as recited in claim 1, wherein the first subimage is displayed in a position in the first region that is in accordance with the first subimage's location in the first image.

13. A method as recited in claim 1 further including:
   determining, using the processor, that a third subimage of the first set does not correspond to any subimage in the second set based at least in part on spatial information associated with the position of the third subimage in the first image; and
   displaying the third subimage in the first region of the display and an empty space in the second region of the display, wherein the position of the third subimage within the first region substantially matches the position of the empty space within the second region.

14. A system comprising:
   a processor; and
   a memory coupled with the processor, wherein the memory is configured to provide the processor with instructions which when executed cause the processor to:
      receive a first set of one or more subimages associated with a first image and a second set of one or more subimages associated with a second image;
      determine that a first subimage of the first set corresponds to a second subimage of the second set based at least in part on spatial information associated with the position of the first subimage in the first image, including by:
         dividing the first image into a first grid; and
         dividing the second image into a second grid, wherein the first subimage and the second subimage occupy corresponding elements of the first grid and the second grid;
      associate the first subimage with the second subimage; and
      display the first subimage in a first region of a display and the second subimage in a second region of the display, wherein the position of the first subimage within the first region substantially matches the position of the second subimage within the second region.

15. A system as recited in claim 14, wherein the first subimage includes at least one of the following: an object detected from the first image, an object automatically detected from the first image, or a portion of the first image selected by a user.

16. A system as recited in claim 14, wherein the first subimage and the second subimage are substantially aligned.

17. A system as recited in claim 14, wherein the first subimage is displayed in a position in the first region that is in accordance with the first subimage's location in the first image.

18. A system as recited in claim 14, wherein the memory is further configured to provide the processor with further instructions to:
   determine, using the processor, that a third subimage of the first set does not correspond to any subimage in the second set based at least in part on spatial information associated with the position of the third subimage in the first image; and
   display the third subimage in the first region of the display and an empty space in the second region of the display, wherein the position of the third subimage within the first region substantially matches the position of the empty space within the second region.

19. A computer program product being embodied in a computer readable medium and comprising computer instructions for:
   receiving a first set of one or more subimages associated with a first image and a second set of one or more subimages associated with a second image;
   determining that a first subimage of the first set corresponds to a second subimage of the second set based at least in part on spatial information associated with the position of the first subimage in the first image, including by:
      dividing the first image into a first grid; and
      dividing the second image into a second grid, wherein the first subimage and the second subimage occupy corresponding elements of the first grid and the second grid;
   associating the first subimage with the second subimage; and
   displaying the first subimage in a first region of a display and the second subimage in a second region of the display, wherein the position of the first subimage within the first region substantially matches the position of the second subimage within the second region.

20. A computer program product as recited in claim 19, wherein the spatial information includes a dimension and/or one or more coordinates.

21. A computer program product as recited in claim 19, wherein the computer program product includes computer instructions for determining by selecting a reference image based at least in part on the number of subimages in the first set.

22. A computer program product as recited in claim 19, wherein the first subimage and the second subimage are substantially aligned.

23. A computer program product as recited in claim 19, wherein the first subimage is displayed in a position in the first region that is in accordance with the first subimage's location in the first image.

24. A computer program product as recited in claim 19, wherein the computer program product further comprises computer instructions for:
   determining, using the processor, that a third subimage of the first set does not correspond to any subimage in the second set based at least in part on spatial information associated with the position of the third subimage in the first image; and
   displaying the third subimage in the first region of the display and an empty space in the second region of the display, wherein the position of the third subimage within the first region substantially matches the position of the empty space within the second region.

* * * * *